(12) United States Patent
Hetrick

(10) Patent No.: US 7,627,789 B2
(45) Date of Patent: Dec. 1, 2009

(54) POLYMORPHIC MANAGEMENT OF EMBEDDED DEVICES USING WEB INTERFACES

(75) Inventor: William A. Hetrick, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 421 days.

(21) Appl. No.: 11/640,551

(22) Filed: Dec. 18, 2006

(65) Prior Publication Data
US 2008/0148286 A1 Jun. 19, 2008

(51) Int. Cl.
*G06F 11/00* (2006.01)
(52) U.S. Cl. ..................................... 714/57
(58) Field of Classification Search .......... None
See application file for complete search history.

(56) References Cited

U.S. PATENT DOCUMENTS

| | | | |
|---|---|---|---|
| 6,944,659 B2 * | 9/2005 | Taggart et al. ......... 709/224 |
| 7,325,170 B2 * | 1/2008 | Srinivasan et al. ......... 714/46 |
| 7,350,115 B2 * | 3/2008 | Mathew et al. ......... 714/46 |
| 2002/0162056 A1 * | 10/2002 | Forman et al. ......... 714/46 |
| 2003/0037293 A1 * | 2/2003 | Owhadi ......... 714/46 |
| 2008/0109683 A1 * | 5/2008 | Erwin et al. ......... 714/46 |
| 2008/0126887 A1 * | 5/2008 | Brodeur et al. ......... 714/57 |

* cited by examiner

*Primary Examiner*—Michael C Maskulinski
(74) *Attorney, Agent, or Firm*—Suiter Swantz pc llo

(57) ABSTRACT

In some embodiments, a method for managing embedded devices may include one or more of the following steps: (a) loading an embedded web server module, (b) loading a first webpage when loading a first embedded module, (c) replacing the first webpage with a second webpage when a second embedded module is loaded or when a failure is detected by the first embedded module, (d) loading a boot loader module, (e) interacting with the computer system to correct the failure condition, (f) loading an embedded operating system module, and (g) loading a third webpage when loading a RAID application module.

6 Claims, 5 Drawing Sheets

POLYMORPHIC MANAGEMENT OF EMBEDDED DEVICES USING WEB INTERFACES

FIELD OF THE INVENTION

Embodiments of the present invention relate to embedded computer systems. Specifically, embodiments of the present invention relate to operating systems for embedded computer systems. More specifically, embodiments of the present invention relate to loading a command handler for a web page as controller software modules initialize.

BACKGROUND OF THE INVENTION

An embedded system is some combination of computer hardware and software, either fixed in capability or programmable, that is specifically designed for a particular kind of application device. Industrial machines, automobiles, medical equipment, cameras, household appliances, airplanes, vending machines, and toys (as well as the more obvious cellular phones and PDA) are among the myriad of possible hosts of an embedded system. Embedded systems that are programmable are provided with a programming interface.

With reference to FIG. 1, a prior art embedded computer system cycling through a series of states is shown. In common storage systems, a RAID (redundant array of independent disks) controller is an embedded computer system 10 that cycles though a series of states 12-20 before the RAID system is fully operational. During the initialization of the RAID application the controller can determine that some serious fault condition exists and lock down as shown at blocks 22-26. Failure states 22-26 can be used to prevent system 10 from encountering a fault during normal operation that could result in data corruption or data loss by implementing a lock down. However, when a controller locks down the storage management software cannot communicate with the controller because the communication protocol used with the storage management software is implemented by the RAID application that was halted in the initialization sequence.

A similar situation can occur when a controller runs a diagnostic application. (Note that some diagnostics are run after the operating system is loaded, but before the main RAID application is loaded.) A controller (e.g., an embedded computer system) can lock down due to a diagnostic failure, again leaving the user with no management interface to assist in diagnosing and repairing the problem. When a controller locks down in the scenarios described above, the user must connect an RS-232 (recommended standard-232) cable to the serial port and use low-level commands (e.g., such as operating system commands similar to DOS and UNIX) to communicate with the controller.

The disadvantage is that the user is given very little help resolving failure scenarios and without help the user could make the same failures (e.g., using incompatible hardware) or make a situation worse (e.g., remove the wrong device). Further, connecting extra cables takes time in the diagnostic process and the cables may not be standard RS-232 cables, so the user may not even have easy access to the interface.

Therefore, it would be desirable to provide a management interface able to assist in diagnosing and repairing a problem with an embedded device.

SUMMARY OF THE INVENTION

In some embodiments, a method for managing embedded devices may include one or more of the following steps: (a) loading an embedded web server module, (b) loading a first webpage when loading a first embedded module, (c) replacing the first webpage with a second webpage when a second embedded module is loaded or when a failure is detected by the first embedded module, (d) loading a boot loader module, (e) interacting with the computer system to correct the failure condition, (f) loading an embedded operating system module, and (g) loading a third webpage when loading a RAID application module.

In some embodiments, a polymorphic management system may include one or more of the following features: (a) a memory comprising, (i) a polymorphic management program that allows a user interact with a computer system to correct computer hardware failures via a webpage, and (b) a processor coupled to the memory that executes the polymorphic management program.

In some embodiments, a machine readable medium comprising machine executable instructions may include one or more of the following features: (a) module load instructions that load and run embedded software modules, (b) webpage instructions that load a webpage specific to the embedded software modules, and (c) failure instructions that replace an existing webpage with a failure webpage detailing any failures for a computer system.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
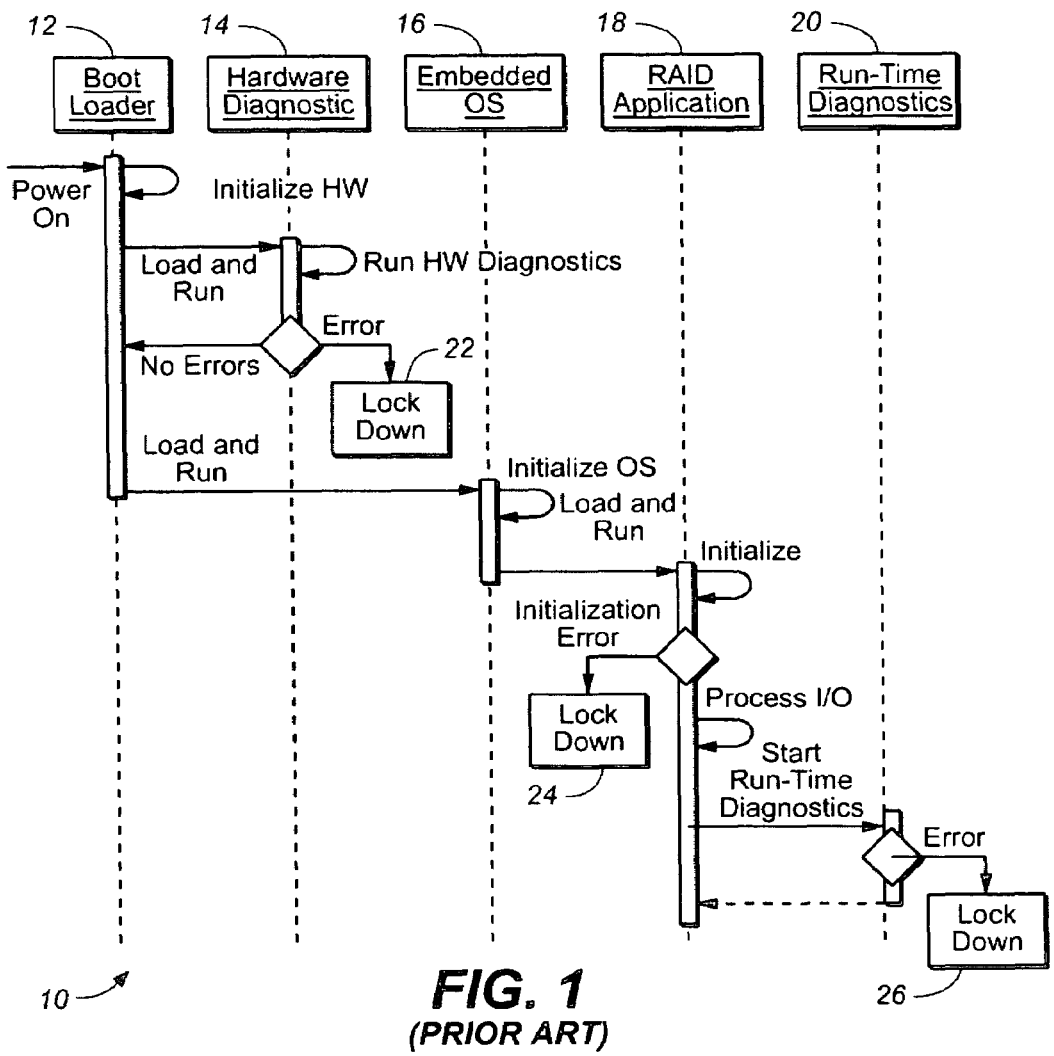
FIG. 1 shows a prior art embedded computer system cycling through a series of states.

Reference will now be made in detail to the presently preferred embodiments of the invention, examples of which are illustrated in the accompanying drawings.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While the description below is discussed in regards to RAID controller systems, embodiments of the present invention could be utilized for management of any embedded device, such as communication network, switch motor controllers, and router switches without departing from the spirit of the present invention.

With widely available and interchangeable networking hardware and software, many embedded systems are built with ports to attach to a network for configuration and monitoring. Ethernet devices and other supporting hardware provide enough computing capability to communicate via standard internet protocols, including serving web pages from an embedded web server.

Embedded web servers typically include a feature that allows dynamic registration of request handlers. Since command handlers are dynamically registered, a command handler can be changed at run-time to change the response data of a web-page request. Embedded systems are made up of several software systems including operating systems, application software, and diagnostic software as is discussed in more detail below.

Embodiments of the present invention allow each software module to load a command handler for a default web page as the controller software modules initialize using an embedded web server and dynamic page handlers. A web server would be loaded as part of the low-level operating system. Then when a diagnostic module loads, it replaces the default page command handler with a diagnostic-specific status page. If the failure management firmware (200 FIG. 4) detects a failure condition, it replaces the default page command handler (e.g., an introductory web page) with a webpage explaining the failure condition that caused the controller to lock down. In most lock-down scenarios of storage systems, the controller would still be capable of serving web page requests from the embedded web server. This is because the controller relies on minimal hardware to operate. While the invention is described with reference to lock-down scenarios, it is fully contemplated that the invention could extend to any system malfunction that would cause the system to either run ineffectively or not at all without departing from the spirit of the invention. Embodiments of the present invention provide a user with context-sensitive guidance from a standard interface without connecting different cables to different user interfaces. This allows the user to use a single interface for all but the most low-level hardware issues where the operating system and server cannot operate properly (e.g., worst-case scenarios). This creates a dynamic user interface controlled by different software modules based upon the state of the embedded system using a common access protocol.

Figure 2:
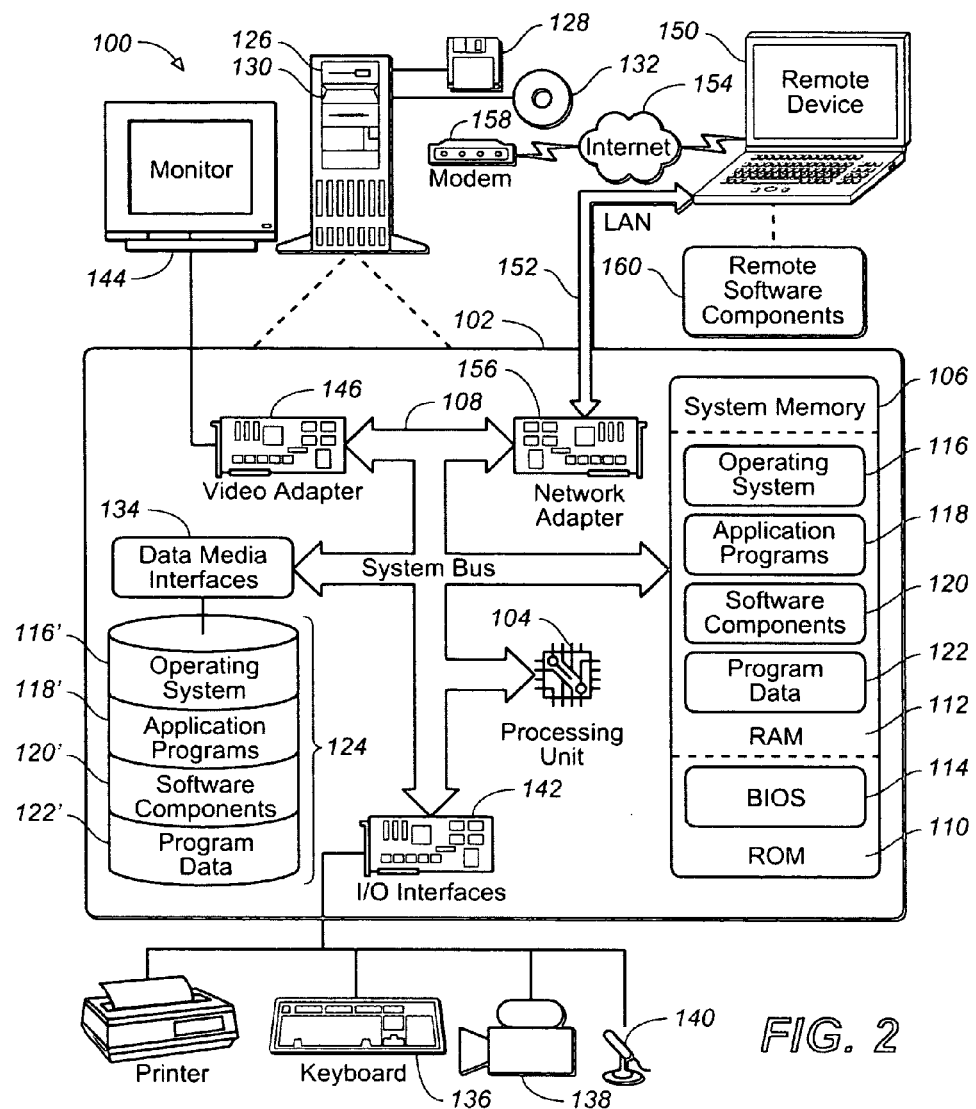
FIG. 2 shows a schematic illustration of an exemplary implementation of a computing device in an embodiment of the present invention.

With reference to FIG. 2, a schematic illustration of an exemplary implementation of a computing device in an embodiment of the present invention is shown. The various components and functionality described herein can be implemented with a number of individual computers. FIG. 2 shows components of a typical example of such a computer, referred by to reference numeral 100. The components shown in FIG. 2 are only examples, and are not intended to suggest any limitation as to the scope of the functionality of the invention; the invention is not necessarily dependent on the features shown in FIG. 2.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules (discussed in detail below), that are executed by the computers. Generally, program modules include routines, programs, objects, components, data structures, etc. that performs particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 2, the components of computer 100 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. "Computer storage media"

includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more in its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 100, such as during start-up, is typically stored in ROM 110. RAM 112 typically contains data and/or program modules that are immediately accessible to and/or presently being operated on by processing unit 104. By way of example, and not limitation, FIG. 2 illustrates operating system 116, application programs 118, other program modules 120, and program data 122.

The computer 100 may also include other removable/non-removable, volatile/nonvolatile computer storage media. By way of example only, FIG. 1 illustrates a hard disk drive 124 that reads from or writes to non-removable, nonvolatile magnetic media, a magnetic disk drive 126 that reads from or writes to a removable, nonvolatile magnetic disk 128, and an optical disk drive 130 that reads from or writes to a removable, nonvolatile optical disk 132 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 124 is typically connected to the system bus 108 through a non-removable memory interface such as data media interface 134, and magnetic disk drive 126 and optical disk drive 130 are typically connected to the system bus 108 by a removable memory interface 134.

The drives and their associated computer storage media discussed above and illustrated in FIG. 2 provide storage of computer-readable instructions, data structures, program modules, and other data for computer 100. In FIG. 2, for example, hard disk drive 124 is illustrated as storing operating system 116', application programs 118', other program modules 120', and program data 122'. Note that these components can either be the same as or different from operating system 116, application programs 118, other program modules 120, and program data 122. Operating system 116, application programs 118, other program modules 120, and program data 122 are given different numbers here to illustrate that, at a minimum, they are different copies. A user may enter commands and information into the computer 100 through input devices such as a keyboard 136, a mouse, trackball, or touch pad. Other input devices (not shown) may include a microphone, joystick, game pad, satellite dish, scanner, or the like. These and other input devices are often connected to the processing unit 104 through an input/output (I/O) interface 142 that is coupled to the system bus, but may be connected by other interface and bus structures, such as a parallel port, game port, or a universal serial bus (USB). A monitor 144 or other type of display device is also connected to the system bus 108 via an interface, such as a video adapter 146. In addition to the monitor 144, computers may also include other peripheral output devices (e.g., speakers) and one or more printers, which may be connected through the I/O interface 142.

The computer may operate in a networked environment using logical connections to one or more remote computers, such as a remote computing device 150. The remote computing device 150 may be a personal computer, a server, a router, a network PC, a peer device or other common network node, and typically includes many or all of the elements described above relative to computer 100. The logical connections depicted in FIG. 2 include a local area network (LAN) 152 and a wide area network (WAN) 154. Although WAN 154 shown in FIG. 2 is the Internet, WAN 154 may also include other networks. Such networking environments are commonplace in offices, enterprise-wide computer networks, intranets, and the like.

When used in a LAN networking environment, the computer 100 is connected to the LAN 152 through a network interface or adapter 156. When used in a WAN networking environment, the computer 100 typically includes a modem 158 or other means for establishing communications over the Internet 154. The modem 158, which may be internal or external, may be connected to the system bus 108 via the I/O interface 142, or other appropriate mechanism. In a networked environment, program modules depicted relative to the computer 100, or portions thereof, may be stored in the remote computing device 150. By way of example, and not limitation, FIG. 2 illustrates remote application programs 160 as residing on remote computing device 150. It will be appreciated that the network connections shown are exemplary and other means of establishing a communications link between the computers may be used.

Figure 3:
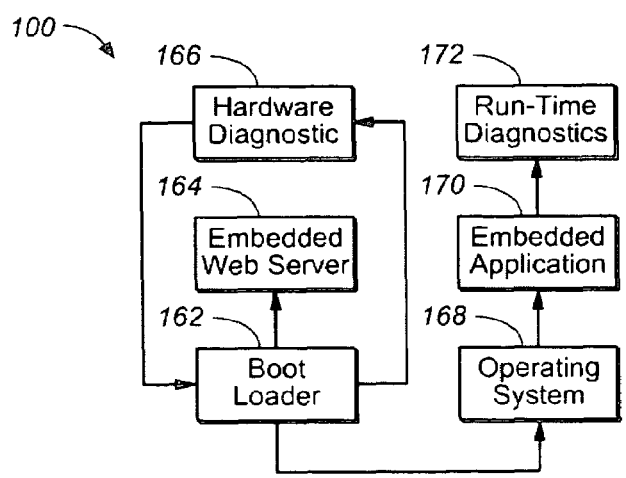
FIG. 3 shows an upper level diagram of a polymorphic management system for embedded devices in an embodiment of the present invention.

With reference to FIG. 3, an upper level diagram of a polymorphic management system for embedded devices in an embodiment of the present invention is shown. Upon power on of embedded computer system 100, the embedded process can begin by boot loader module 162 initializing embedded web server module 164. After initialization of web server module 164, boot loader module 162 can instruct hardware diagnostic module 166 to initialize the hardware of system 100 and can then instruct hardware diagnostic module 164 to load and run the hardware diagnostics. Hardware diagnostic module 164 can then run the hardware diagnostics and report back to boot loader module 162 if there were any failures found with computer system 100. If no failures were found, boot loader module 162 could then instruct embedded operating system module 168 to load and run. Embedded operating system module 168 could then initialize the operating system and instruct embedded application module 170 to load and run. For purposes of the disclosure, embedded application module 170 can be an embedded RAID application for the control and monitoring of a RAID system, however, embedded application module 170 can be most any embedded application, such as a communication network application, a switch motor controller application, and a router switch application without departing form the spirit of the invention. Further, a RAID system can be represented as remote device 150 and for purposes of the disclosure, remote device 150 is a RAID system. Raid application 170 could then initialize, process any input and/or output, and start run time diagnostics module 172. After which embedded computer system 100 can be up and running and fully operational.

Figure 4:
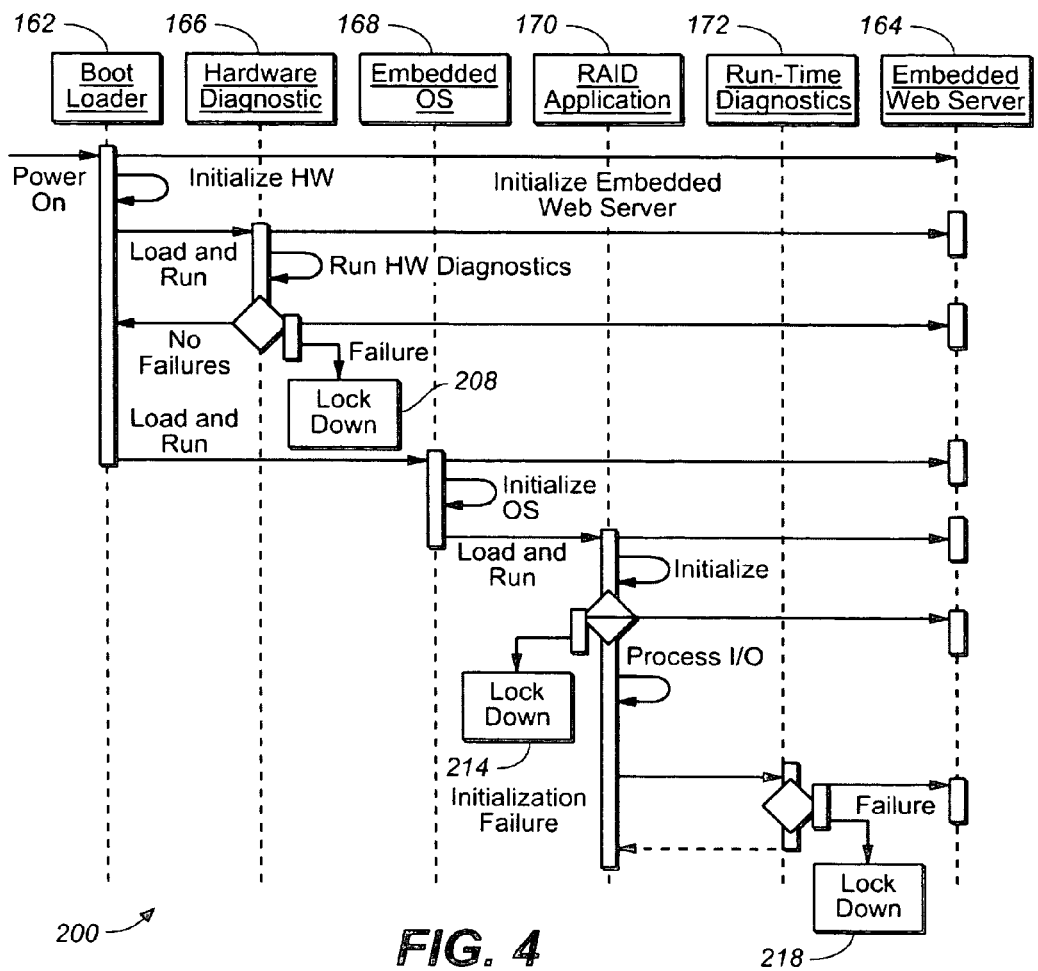
FIG. 4 shows a run state diagram of a polymorphic management system for embedded devices in an embodiment of the present invention.
Figure 5:
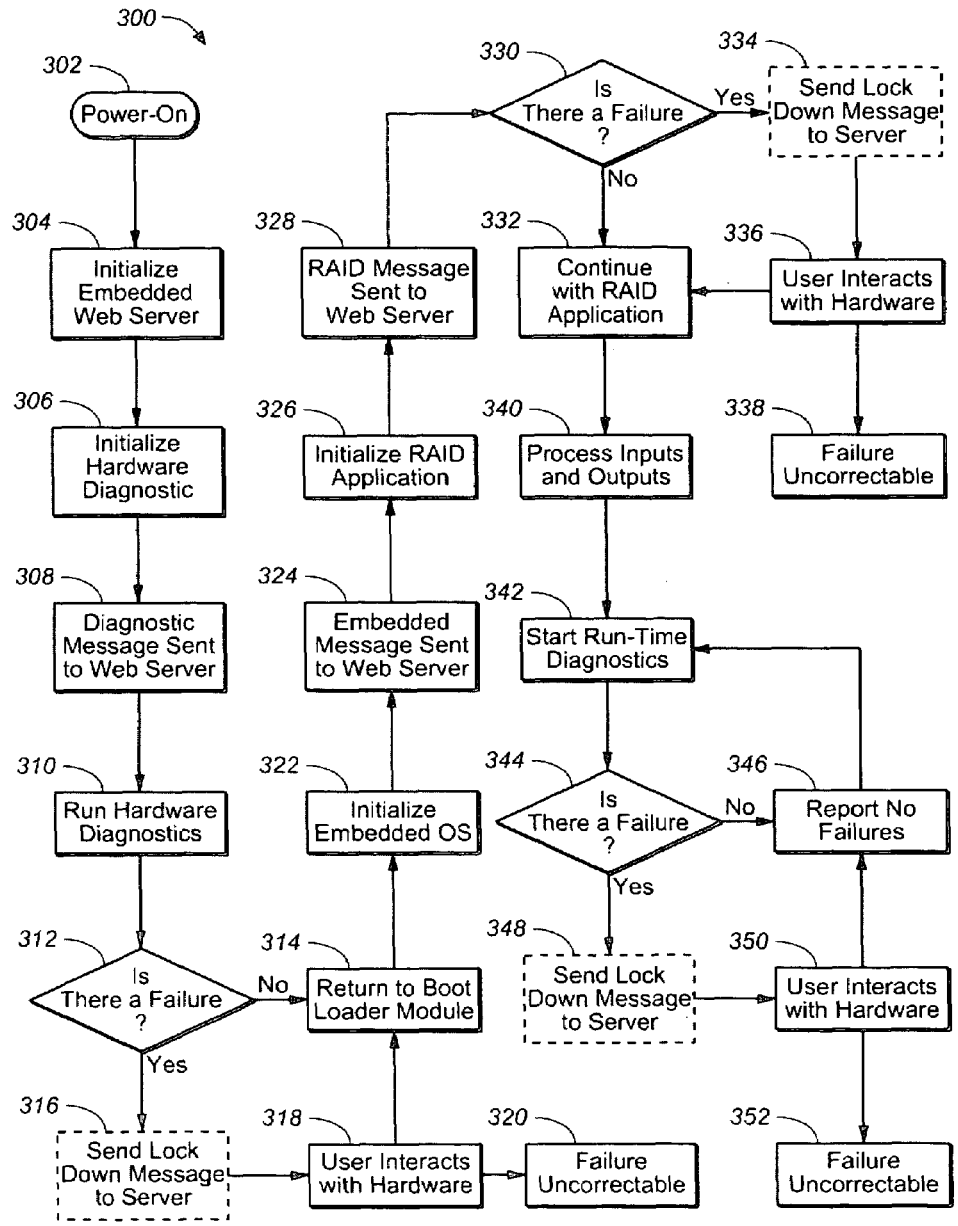
FIG. 5 shows a flow chart diagram of a polymorphic management system for embedded devices in an embodiment of the present invention.
Figure 6:
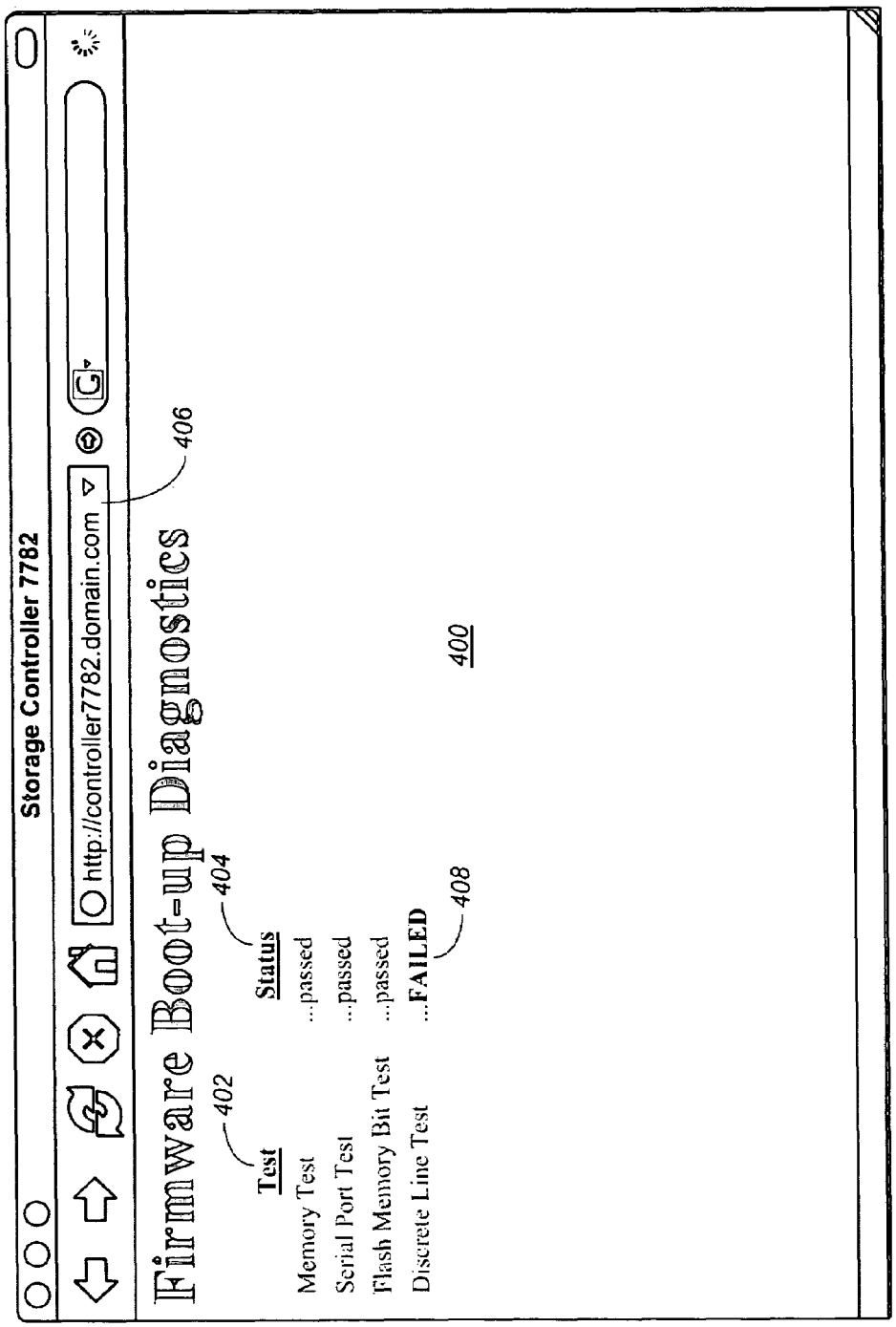
FIG. 6 shows a diagram of a webpage in an embodiment of the present invention.

With reference to FIGS. 4 and 5, a polymorphic management system for embedded devices in an embodiment of the present invention is shown. Polymorphic management program (PMP) 300 begins at state 302 where polymorphic management system (PMS) 200 can be powered on by a user of PMS 200. Boot loader module 162 can then initialize embedded web server module 164 at state 304 and a default web page is presented to the user informing the user as to the current status of PMS 200. While embedded web server module 164 is being represented as being loaded after boot loader module 162, it is fully contemplated that embedded web server module 164 could be loaded at most any time without departing from the spirit of the invention. However, it is helpful if embedded web server 164 is loaded in the early stages of PMP 300 to allow the user to view how PMS 200 is progressing (FIG. 6). At state 306, hardware diagnostic module 166 can be initialized and instructed to load and run. At state 308, a register diagnostic management interface command handler can be sent to web server module 164 and a diagnostic management interface web page can be presented to the user updating the user as to the status of PMS 200. At state 310, hardware diagnostic module 166 could run hardware diagnostics on computer system 100. At state 312, it is determined if any failures have been detected. If no failures have been detected, then PMP 300 can return back to boot loader module 162 at state 314. If failures were found, then a lock down can occur at state 208 and a register hardware lock-down management interface command handler can be sent to web server module 164 at state 316. A hardware lock-down web page can replace the current webpage informing the user of what the system failure is and possibly informing the user of the ways the user can fix the failure. It is noted that a lock down is not necessary for embodiments of the present invention and could be skipped.

At state 318 the user is able to interact with computer system 100 in an attempt to correct the existing failures. If the failure is not correctable by the user (e.g., a piece of firmware needs replaced), then PMP 300 can proceed to state 320 where the user is able to replace the hardware component. If the user is able to correct the failures, PMP 300 can proceed to state 314 returning PMP 300 to boot loader module 162. PMP 300 can then command embedded operating system module 168 to initialize, load, and run at state 322. Upon embedded operation system module 168 loading, a register operation system management interface command handler can replace the previous web page command handler informing the user that embedded operating system module 168 is currently initializing, loading, and beginning to run at state 324. After embedded operating system module 168 has finished initializing, loading, and begun running, embedded operating system module 168 can command RAID application module 170 to initialize, load, and run at state 326. At state 328 a register application management interface command handler can replace the previous web page command handler informing the user that RAID application module 170 has been initialized, loaded, and is running.

During the initialization and loading process, RAID module 170 can conduct diagnostics at state 330 to determine if any failures exist in RAID device 150. If there are no failures, PMP 300 can continue processing of RAID application module 170 at state 332. If any failures are detected, PMS 200 can proceed to a lock down state 214 and a register application lock-down management interface command handler can be sent to the web server at state 334. A lock-down management webpage can be presented to the user through embedded web server module 164. The lock-down management webpage can present the user with any and all failures which have been detected. The user can then interact with RAID device 150 through the lock-down management webpage to diagnose the failures and correct them. In some embodiments the lock-down management webpage can suggest ways to correct the failure. If the user is unable to correct the problem, PMP 300 can proceed to state 338 and notify the user that firmware will need to be replaced because the failure is uncorrectable. If the user is successful and is able to correct all failures, PMP 300 can proceed to state 332 and continues on with running RAID application module 170.

PMP 300 can proceed to state 340 where RAID application module 170 can process all inputs and outputs to RAID device 150. PMP 300 can then proceed to state 342 where it initiates run-time diagnostics using run-time diagnostic module 172. Run-time diagnostic module 172 can continually look for failures with RAID device 150 at state 344. If no failures are discovered by run-time diagnostic module 172, run time diagnostic module 172 can report this to RAID application module 170 at state 346. PMP 300 can then return to state 342 where run-time diagnostic module 172 continues to run diagnostics on RAID device 150. If a failure is detected at state 344, a lock-down can occur at state 218 and PMP 300 can proceed to state 348 where a register run-time diagnostic lock-down interface command handler can be sent to embedded web server module 164. This command handler can replace the last webpage with a diagnostic specific status page informing the user of what failures are present and possibly assisting the user in how best to correct these failures. The user can then interact with RAID device 150 at state 350. If the user is able to correct the failures, PMP 300 can proceed to state 346 notifying RAID application module 170 that the failures have been removed and then to state 342 to begin running diagnostics once again. If the user is unable to remove the failures, then PMP 300 can proceed to state 352 and inform the user that the failures are uncorrectable.

With reference to FIG. 6, a diagram of a webpage in an embodiment of the present invention is shown. Webpage 400, as discussed above, could be any of the above-mentioned webpages. Utilizing webpage 400 the user can obtain information about the operation of computer 100, specifically the operation of embedded systems controlled by computer 100. Webpage 400 could show which test 402 is being run. Webpage 400 could also show status 404 of test 402 being run. As shown, a failure message 408 is being displayed on webpage 400, therefore, in this instance, webpage 400 could be a failure webpage. Each webpage 400 could have a unique web address 406 specific to the embedded devices. Further, the user could enter the embedded device specific address to monitor an embedded device at any time.

While embodiments of the present invention have been described as implementing a lock down procedure, it is fully contemplated that this procedure is not necessary. PMP 300 could be implemented without a lock down procedure and instead only a failure message would be sent to web server.

Embodiments of the present invention allow for dynamic user interface controlled by different software modules based on the state of the embedded system using a common access protocol. The user can be presented with context-sensitive guidance from a standard interface without connecting new cables to different user interfaces. This allows the user to use a single interface for all but the most low-level hardware issues where the operating system and web server cannot operate properly.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. Features of any of the variously described embodiments may be used in other embodiments. The form herein before described being merely an explanatory embodiment thereof. It is the intention of the following claims to encompass and include such changes.

What is claimed is:

1. A method for managing embedded devices, comprising the steps of:

loading an embedded web server module;

loading a first webpage when loading a first embedded module;

replacing the first webpage with a second webpage when a second embedded module is loaded or when a failure is detected by the first embedded module; and loading a third webpage when loading a RAID application module.

2. The method of claim 1, further comprising loading a boot loader module.

3. The method of claim 1, further comprising the step of interacting with the computer system to correct the failure condition.

4. The method of claim 3, wherein the second webpage displays a failure in a computer system.

5. The method of claim 1, further comprising loading an embedded operating system module.

6. The method of claim 1, wherein the first embedded module is a diagnostic module.

* * * * *